US005160942A

United States Patent [19]

Omata et al.

[11] Patent Number: 5,160,942

[45] Date of Patent: Nov. 3, 1992

[54] SERIAL TYPE THERMAL PRINTER

[75] Inventors: Yasukuni Omata, Chigasaki; Yoshinori Osamura, Yamato, both of Japan

[73] Assignee: Minolta Camera Kabushiki Kaisha, Osaka, Japan

[21] Appl. No.: 76,739

[22] Filed: Jul. 23, 1987

[30] Foreign Application Priority Data

| | | | |
|---|---|---|---|
| Jul. 23, 1986 | [JP] | Japan | 61-173274 |
| Jul. 23, 1986 | [JP] | Japan | 61-173275 |
| Jul. 31, 1986 | [JP] | Japan | 61-181685 |
| Jul. 31, 1986 | [JP] | Japan | 61-181686 |
| Aug. 19, 1986 | [JP] | Japan | 61-193768 |
| Aug. 19, 1986 | [JP] | Japan | 61-193769 |

[51] Int. Cl.[5] ........ G01D 15/10

[52] U.S. Cl. ........ 346/76 PH; 346/46; 400/206

[58] Field of Search ........ 346/76 PH, 46; 400/206, 400/206.1, 216, 216.1, 208, 208.1, 212, 214

[56] References Cited

U.S. PATENT DOCUMENTS 4,403,874 9/1983 Payne et al. ........ 346/46

FOREIGN PATENT DOCUMENTS

| | | | |
|---|---|---|---|
| 0055258 | 4/1983 | Japan | 400/206 |
| 0124687 | 7/1983 | Japan | 400/206 |
| 58-187395 | 11/1983 | Japan . | |
| 59-184674 | 10/1984 | Japan . | |
| 59-218887 | 12/1984 | Japan . | |
| 60-210467 | 10/1985 | Japan . | |

*Primary Examiner*—E. A. Goldberg
*Assistant Examiner*—Lincoln Donovan
*Attorney, Agent, or Firm*—Burns, Doane, Swecker & Mathis

[57] ABSTRACT

A serial type thermal printer for printing while moving a carriage. The printer includes two thermal heads mounted on the carriage and arranged axially of a platen roller. Two ink film cassettes are arranged side by side on the carriage to be associated with the two thermal heads, respectively. A two-direction printing is effected where one of the thermal heads is pressed upon the platen roller during a forward movement of the carriage and the other head is pressed upon the platen roller during a backward movement thereof. A two-color or multicolor printing is carried out without changing the ink film cassettes where the cassettes contain ink films of different colors.

18 Claims, 13 Drawing Sheets

ℓ1 = ℓ2 = ℓ3 = recording paper width

SERIAL TYPE THERMAL PRINTER

FIELD OF THE INVENTION

The present invention relates to a serial type thermal printer, and particularly to a serial type thermal printer including two printing sections on a carriage.

BACKGROUND OF THE INVENTION

The serial type thermal printer generally includes one printing head and one ink film cassette mounted on a carriage. This construction has only a limited possibility of improvement in terms of function. For example, such a printer permits printing only in the color of an ink film contained in the cassette at a time. Printing in another color requires a change of the cassette. It is therefore conceivable to provide a printing section of composite structure.

The Japanese patent application laid open under No. 59-218887 discloses a printer wherein two ink film cassettes are arranged one above the other and are switchable therebetween to carry out printing during a backward movement as well as a forward movement of the carriage. The Japanese patent application laid open under No. 58-187395 discloses a printer which employs a two-tier ink film with an upper color tier and a lower black tier, the color tier including repeated series of yellow, magenta and cyan. This ink film is vertically shiftable in accordance with color printing and black printing.

The former has the advantage of high speed printing achieved by two-direction printing. The latter has the advantage of enabling color printing and black-only printing without changing the film. However, these printers invariably require a mechanism for vertically shifting the cassettes or films, which results in complicated constructions. Although the former has the advantage of high speed printing over a printer which prints only during a movement of the carriage in one direction, it is necessary to switch between the vertically arranged ink cassettes after printing each line. This switching operation takes time and obstructs achievement of a satisfactory printing speed.

SUMMARY OF THE INVENTION

A primary object of the present invention, therefore, is to provide a serial type thermal printer having improved functions.

Another object of the invention is to provide a thermal printer including two printing sections arranged on a carriage in a direction of carriage movement, wherein various functions are performed by the two printing sections.

A further object of the invention is to provide a thermal printer capable of printing without time losses by making effective use of carriage reciprocation.

A still further object of the invention is to provide a thermal printer including two printing sections arranged on a carriage in a direction of carriage movement, to enable the printing sections to print according to different color data.

A still further object of the invention is to provide a thermal printer including two printing sections arranged on a carriage in a direction of carriage movement, the two printing sections being usable for printing by means of a simple mechanism.

These and other objects of the invention are fulfilled by a carriage shift type thermal printer comprising a rotatable platen roller for guiding recording paper; a carriage opposed to and reciprocable axially of the platen roller, the carriage being adapted to carry two ink film cassettes arranged axially of the platen roller, and including a head projecting mechanism for pressing upon the platen roller two thermal heads associated with the ink film cassettes, and a film drive mechanism for taking up ink films; and control means for controlling the head projecting mechanism and the ink film drive mechanism correlatively to reciprocation of the carriage.

More particularly, the ink films contained in the two cassettes are taken up in opposite directions. The head projecting mechanism is controlled to project the thermal head associated with the cassette having a film takeup direction opposite the direction in which the carriage moves for a printing operation.

The ink films contained in the two cassettes may be taken up in the same direction. In this case, printing is carried out only during a forward movement or a backward movement of the carriage. Also in this case there are two modes available, in one of which either thermal head is pressed upon the platen roller for each movement of the carriage, and in the other mode both thermal heads are pressed for each movement of the carriage. Both modes are effected under control by the control means. Where the two thermal heads are pressed alternately, the head projecting mechanism includes a mechanism for alternately pressing and releasing the two heads and a single drive source for actuating this mechanism.

The ink film drive mechanism is controlled to take up the ink films in the two cassettes alternately or simultaneously or independently of each other in synchronism with a printing operation of the thermal heads.

Furthermore, the two ink film cassettes mounted on the carriage may contain ink films of the same color or ink films of different colors. Where ink films of different colors are used, one of the ink films may include yellow, magenta and cyan arranged in a selected order and in repeated series.

According to the present invention, two sets of thermal heads and ink film cassettes are provided on the carriage and arranged axially of the platen roller. This construction permits printing to be carried out while maintaining the ink film cassettes fixedly mounted on the carriage without vertically shifting the cassettes as practiced in the prior art. The entire construction is simplified by dispensing with an elevator mechanism or the like for vertically shifting the cassettes. The invention provides further advantages of rendering the printing speed faster because of the omission of cassette shifting and of not requiring a dead space for the cassette shifting.

In addition, where two ink film cassettes containing ink films of different colors are mounted on the carriage, there are advantages of enabling high speed two-color printing without changing the ink film cassettes and of reducing running cost of the printer.

Where one of the ink film cassettes contains a color ink film and the other contains a black ink film, the same recording paper may be printed with a color graphic mode as well as a black text mode.

BRIEF DESCRIPTION OF THE DRAWINGS

These and other objects, advantages and features of the invention will become apparent from the following description thereof taken in conjunction with the accompanying drawings, in which.

DETAILED DESCRIPTION OF THE PREFERRED EMBODIMENTS

Figure 1:
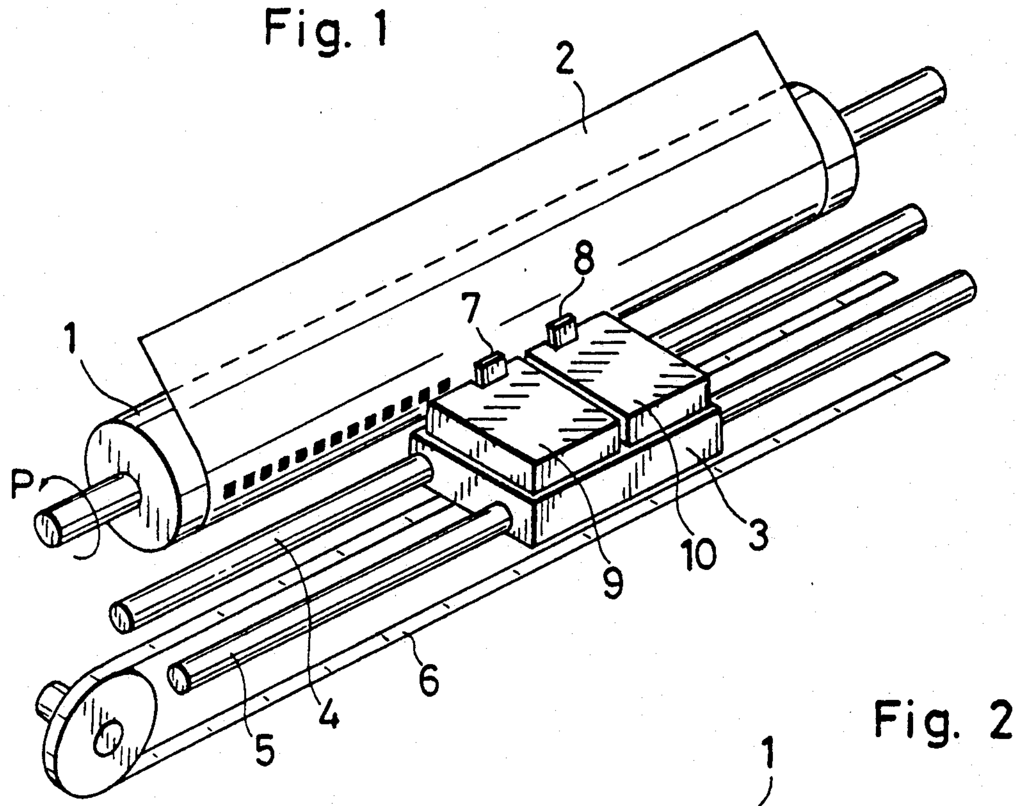
FIG. 1 is a schematic perspective view of a printer constituting one embodiment of the present invention.

FIG. 1 is a schematic view of a printer constituting one embodiment of the present invention. The printer comprises a platen roller 1 for supporting recording paper 2, which is intermittently rotatable by line feed means, not shown, in an auxiliary scanning direction P in a timed relationship with reciprocations of a carriage 3. The carriage 3 is slidably mounted on two bars 4 and 5 extending axially of the platen roller 1, and is driven by backward and forward rotations of a pulse motor, not shown, to reciprocate along the bars 4 and 5. The carriage 3 supports two sets of thermal heads 7 and 8 and ink film cassettes 9 and 10 arranged axially of the platen roller 1.

Figure 2:
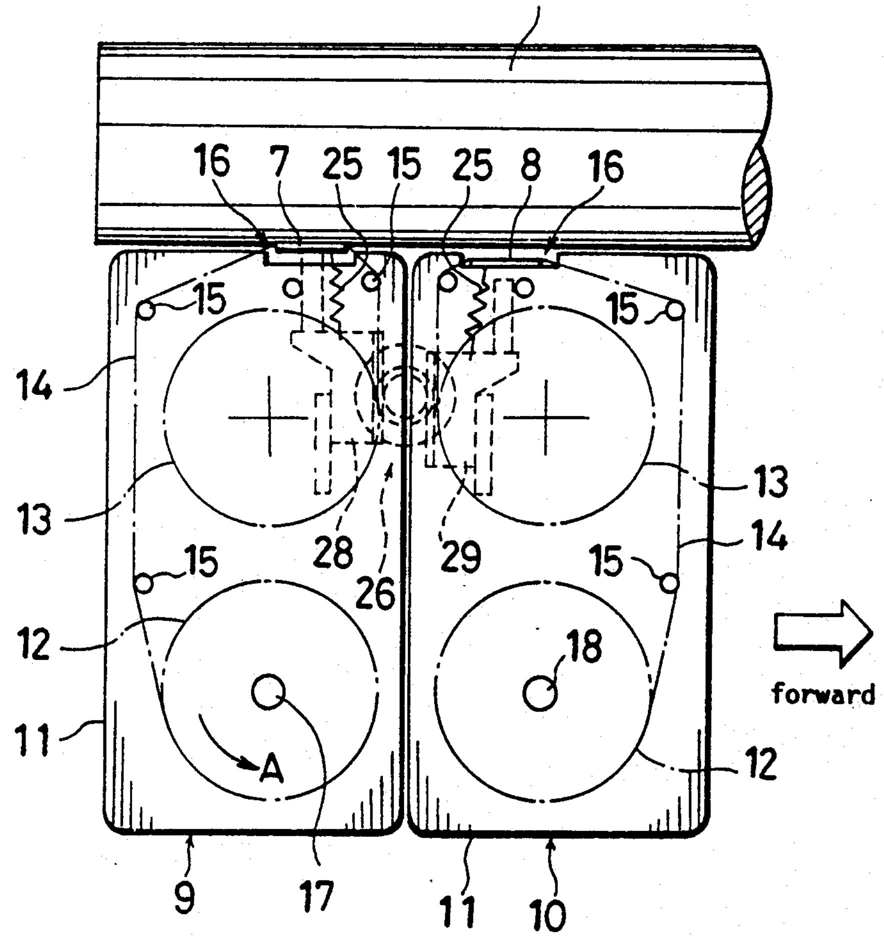
FIG. 2 is a plan view of a printing section during a forward movement of a carriage.
Figure 3:
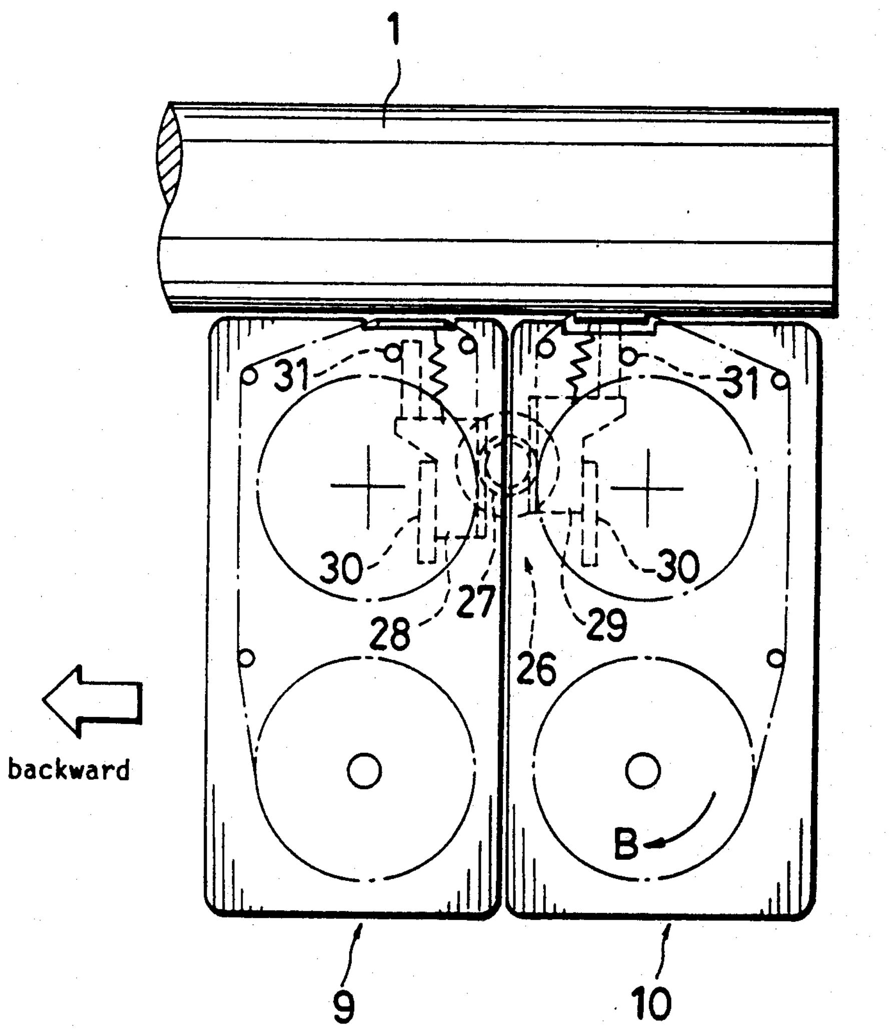
FIG. 3 is a plan view of the printing section during a backward movement of the carriage.

As shown in FIGS. 2 and 3, each of the ink film cassettes 9 and 10 has a vertical construction with a cassette case 11 housing a takeup reel 12 and supply reel 13 arranged in a direction perpendicular to the axis of platen roller 1 when mounted on the carriage 3. This vertical construction permits the two ink film cassettes 9 and 10 to be arranged in a small space. A black ink film 14 extends between the takeup reel 12 and the supply reel 13 by way of a plurality of rollers 15 and the thermal head 7 or 8. The cassette cases 11 are shown broken away at 16 where the ink films 14 extend in contact with the thermal heads 7 and 8.

Of the two ink film cassettes 9 and 10, the lefthand cassette 9 is used for printing during a forward movement of the carriage 3 and the righthand cassette 10 is used for printing during a backward movement of the carriage 3. The two ink film cassettes 9 and 10 have a symmetric construction. Normally, two cassettes having an identical construction are used, with one of them 9 placed front side up and the other 10 placed back side up.

Figure 4:
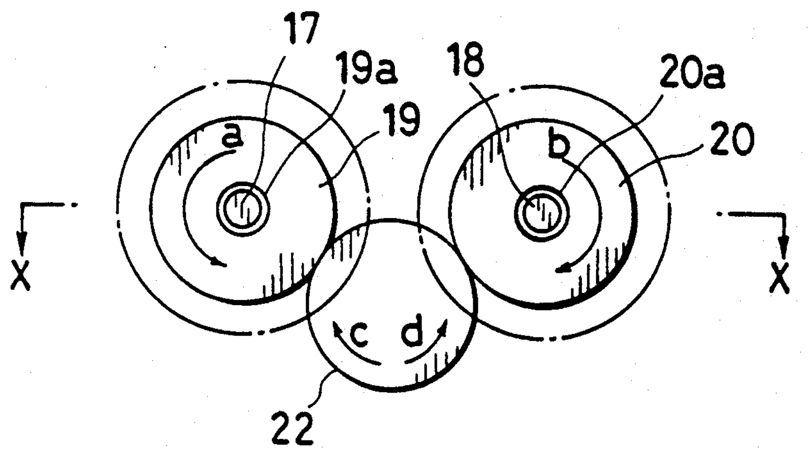
FIG. 4 is a schematic plan view of a drive mechanism for taking up an ink film.
Figure 5:
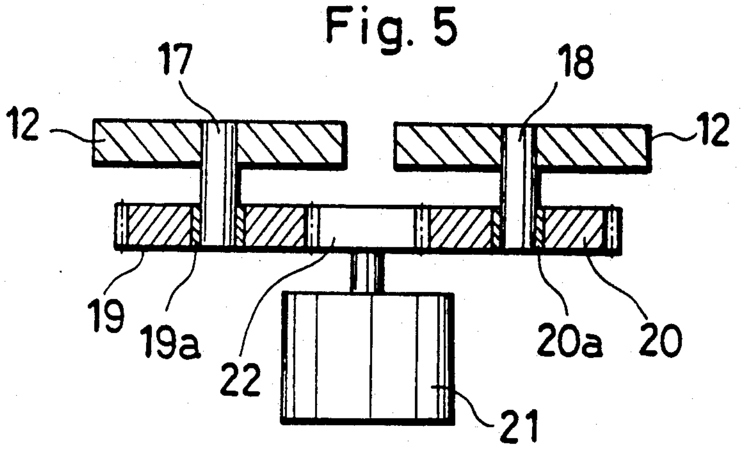
FIG. 5 is a section taken on line X—X of FIG. 4.

When the ink film cassettes 9 and 10 are mounted on the carriage 3, the respective takeup reels 12 are connected to drive shafts 17 and 18 projecting upwardly from the carriage 3. The supply reels 13 are connected to freely rotatable shafts, not shown, projecting from the carriage 3. As shown in FIGS. 4 and 5, lower ends of the drive shafts 17 and 18 are fixed to gears 19 and 20 including one-way clutches 19*a* and 20*a* in the carriage 3. Both gears 19 and 20 are meshed with a gear 22 fixed on a shaft of a single drive source 21 such as a motor rotatable backward and forward. The one-way clutches 19*a* and 20*a* cause only one of the drive shafts 17 to rotate in a direction a when the drive source 21 rotates in a direction c, and only the other drive shaft 18 to rotate in a direction b when the drive source rotates in a direction d. The drive source 21 is controlled by a control circuit, not shown, to rotate in the direction c when the carriage 3 moves forward and to rotate in the direction d when the carriage 3 moves backward. Consequently, the ink film 14 in the lefthand cassette 9 is taken up in a direction A as shown in FIG. 2 when the carriage 3 moves forward, and the ink film 14 in the righthand cassette 10 is taken up in a direction B as shown in FIG. 3 when the carriage 3 moves backward.

Figure 6:
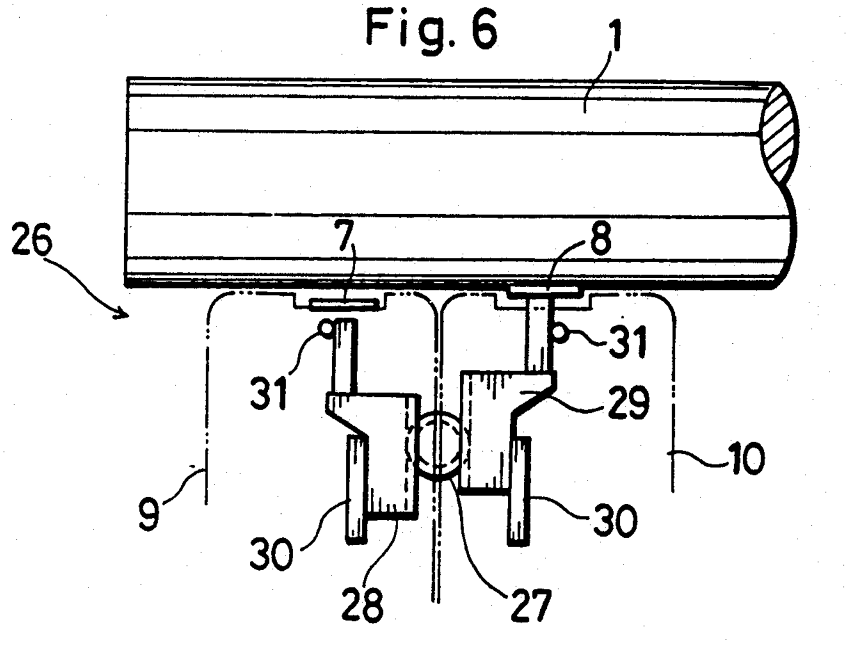
FIG. 6 is a plan view of one example of a head projecting mechanism.

As in known printers, the thermal heads 7 and 8 are attached to the carriage 3 to be movable toward and away from the platen roller 1 and are biased away from the platen roller 1 by springs 25. Each thermal head 7 or 8 is pressed upon the platen roller 1 by a mechanism provided in the back of the thermal head. The illustrated embodiment includes a single projecting mechanism 26 for alternately projecting the two thermal heads 7 and 8 into pressure contact with the platen roller 1 as the carriage 3 moves backward and forward. As shown in FIGS. 2, 3 and 6, the projecting mechanism 26 includes a pinion 27 connected to a reversible motor or the like and two racks 28 and 29 meshed with the pinion 27. Each rack 28 or 29 projects and retracts as guided by a rack guide 30 and a guide pin 31. The projection here refers to a movement toward the platen roller 1 and the retraction to a movement away from the platen roller 1. The rack 28 is disposed behind the thermal head 7 and the other rack 29 behind the other thermal head 8. The two racks 28 and 29 are meshed with the pinion 27 such that when one of the racks 28 or 29 is in a projected position the other rack 28 or 29 is in a retracted position as shown in the drawings. Thus, the two thermal heads 7 and 8 may be pressed upon the platen roller 1 alternately as the carriage 3 reciprocates along the platen roller 1, by rotating the motor forward at times of printing operation with the carriage 3 moving forward and rotating the motor backward at times of printing operation with the carriage 3 moving backward.

Figure 7:
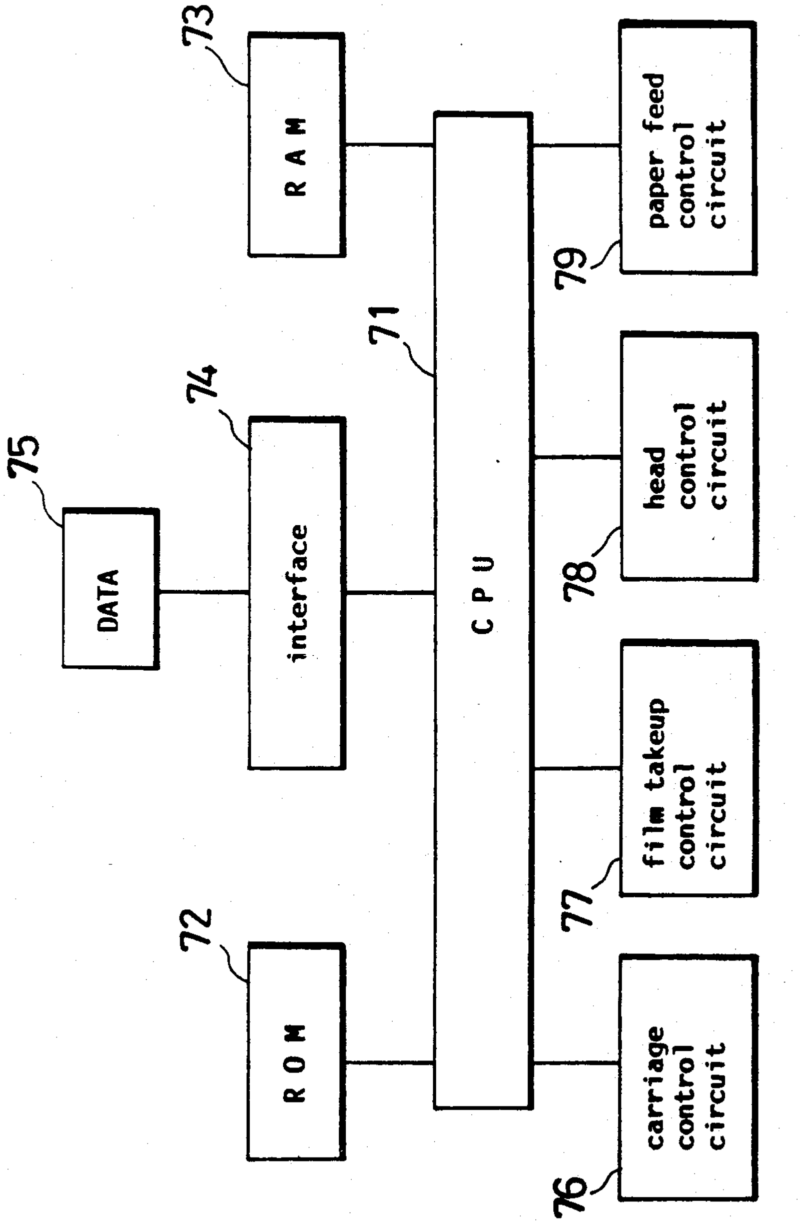
FIG. 7 is a diagram of a control system for controlling a printing operation of the printer according to the present invention.

The pulse motor for moving the carriage 3, the motor 21 for taking up the ink film 14, the head projecting mechanism 26 and so on are controlled by a control system shown in FIG. 7. This control system includes a CPU 71, a ROM 72, a RAM 73 and an interface circuit 74. The CPU 71 reads printing data 75 through the interface circuit 74. A carriage control circuit 76 controls the rotations of the pulse motor for moving the carriage 3. A film takeup control circuit 77 controls the rotations of the drive source 21. The head control circuit 78 controls the head projecting mechanism 26 and head heating elements. A paper feed control circuit 79 controls the intermittent rotation of platen roller 1. These circuits carry out the respective controls in accordance with programs stored in the ROM 72 and RAM 73.

Figure 8:
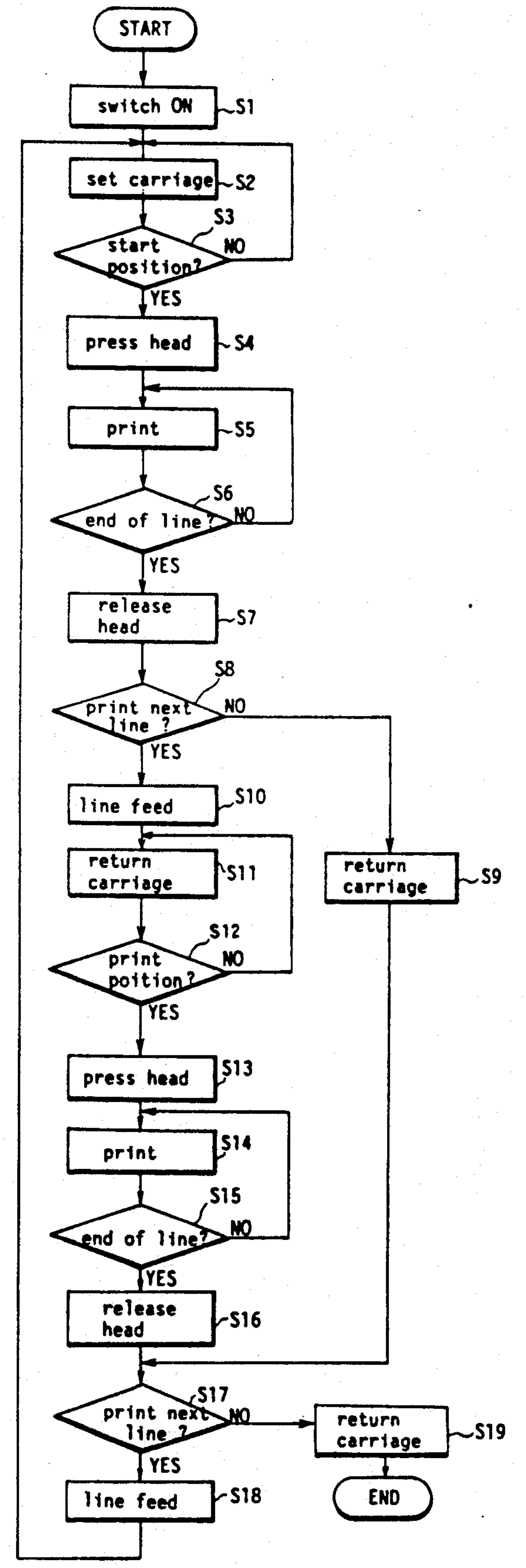
FIG. 8 is a flowchart illustrating the printing operation.

FIG. 8 illustrates a printing operation carried out under control by the control system shown in FIG. 7. First, a print switch is turned on at step S1, whereupon the carriage 3 moves from an initial, extreme lefthand position with respect to the platen roller 1 (FIG. 2) to a print start position at steps S2 and S3. The print start position for the forward movement of the carriage 3 corresponds to a position of the righthand thermal head 8 when the carriage 3 is at the extreme lefthand position shown in FIG. 2 or a position rightwardly shifted therefrom by a certain fixed amount. The print start position for the backward movement of the carriage 3 corresponds to a position of the lefthand thermal head 7 when the carriage 3 is at an extreme right position with respect to the platen roller 1 as shown in FIG. 2 or a position leftwardly shifted therefrom by a certain fixed amount. At step S4 the thermal head 7 is pressed upon the platen roller 1 when the carriage 3 reaches the print start position, provided that the printing data have been input. Simultaneously, at step S5 printing is effected while taking up the ink film 14 in the ink film cassette 9. When the carriage 3 arrives at a predetermined print stop position, which preferably coincides with the print start position for the backward movement of carriage 3, one line printing is completed and the thermal head 7 is released from the pressure contact with the platen roller 1 at steps S6 and S7.

When step S8 finds that there is no printing for a next line, at step S9 the carriage 3 just returns to the initial position at the lefthand end of the platen roller 1 without printing. If a next line is to be printed, the line feed means rotates the platen roller 1 by an amount corresponding to one line feed at step S10. Then, at steps S11 and S12 the carriage 3 is moved back to the start position for the backward movement of the carriage 3. At step S13 the thermal head 8 is pressed upon the platen roller 1, and at step S14 printing is effected by causing the backward movement of the carriage 3 and taking up the ink film 14 in the ink film cassette 10. When the printing of this line is completed at step S15, the thermal head 8 is released from the pressure contact at step S16. If step S17 finds that a further line is to be printed, a line feed is effected at step S18 and the above sequence is repeated. If there is no further printing, the carriage 3 is returned to the extreme lefthand position at step S19 to complete the printing operation.

Figure 9:
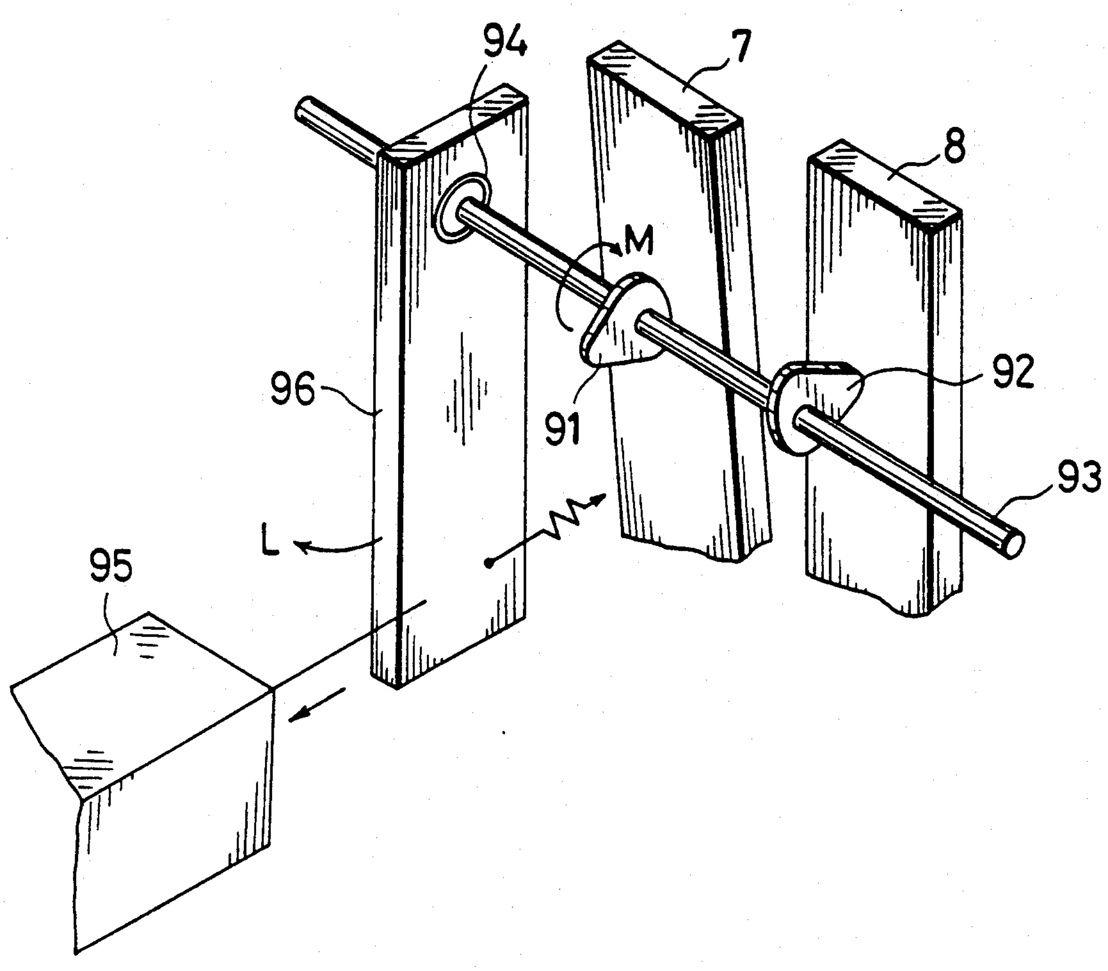
FIGS. 9 and 10 are views illustrating other examples of the head projecting mechanism, respectively.
Figure 10:
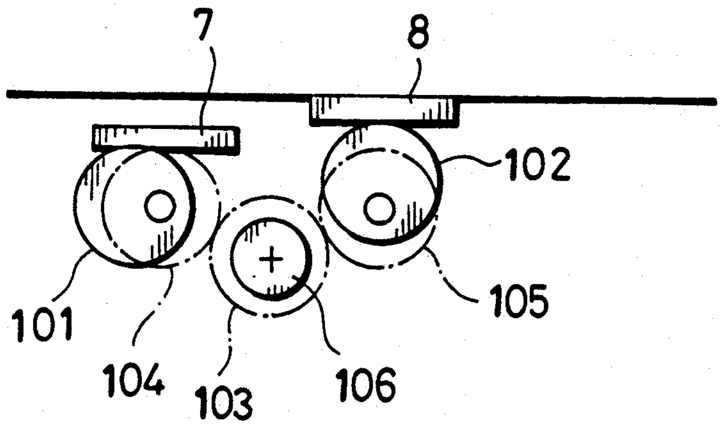

FIGS. 9 and 10 illustrate other examples of a head projecting mechanism 26 feasible for the present invention. FIG. 9 illustrates an example utilizing eccentric cams 91 and 92. As seen, the eccentric cams 91 and 92 are mounted on a shaft 93 with a 180 degree phase difference therebetween. With every half rotation of the shaft 93 one of the cams 91 and 92 contacts the thermal head 7 or 8 and presses it upon the platen roller 1. FIG. 9 shows a position where the thermal head 8 is pressed upon the platen roller 1. The shaft 93 is connected through a one-way clutch 94 to a lever 96 oscillatable by electrifying and unelectrifying a solenoid 95. When the solenoid 95 is electrified, the lever 96 oscillates in a direction indicated by an arrow L, which rotates the cams 91 and 92 in a direction indicated by an arrow M. When the solenoid 95 is unelectrified, the lever 96 oscillates in a direction opposite to that indicated by the arrow L. At this time the one-way clutch 94 holds the shaft 93 and the cams 91 and 92 against rotataion. Consequently, the thermal heads 7 and 8 are alternately pressed upon the platen roller 1 by repeatedly electrifying and unelectrifying the solenoid 95.

FIG. 10 shows an example in which the thermal heads 7 and 8 are alternately pressed by eccentric cams 101 and 102 attached to driven gears 104 and 105 meshed with a drive gear 103. Number 106 in FIG. 10 indicates a motor for rotating the drive gear 103.

The two ink film cassettes arranged on the carriage may contain ink films of different colors instead of ink films of the same color. For example, one of the cassettes may contain a black ink film and the other a red or blue ink film. Alternatively, one of the cassettes may contain a black ink film and the other a color ink film including sections of yellow, magenta and cyan arranged in series. Where one of the cassettes contains a black ink film and the other a red or blue ink film, for example, part of black print data may be printed in red or blue to produce emphasis for reader's attention. Where one of the cassettes contains a black ink film and the other an ink film of plural colors, a seven color graphic mode and a black text mode will be made available for printing the same recording paper.

Figure 11:
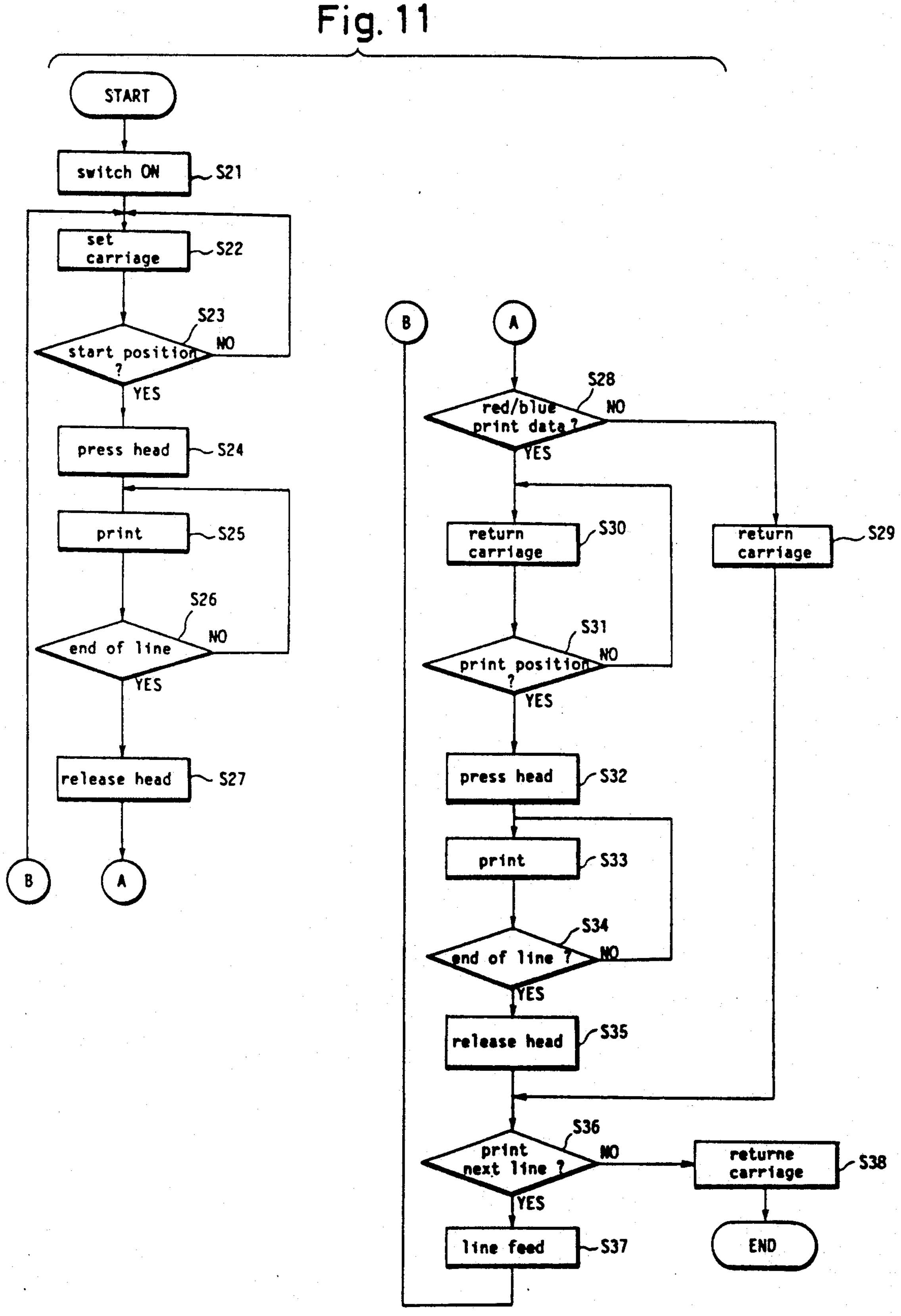
FIG. 11 is a flowchart illustrating a two-color printing operation of the printer according to the present invention.

FIG. 11 is a flowchart illustrating an operation of the control system where a black ink film is used for printing with the forward movement of the carriage 3, and a red or blue ink film is used for printing with the backward movement of the carriage 3. Steps S21 through S27 taken when the carriage 3 moves forward correspond to steps S1 through S7 in FIG. 8. After the carriage 3 moves forward to the start position for the backward movement or a position adjacent thereto and the thermal head is released from the pressure contact at step S27, the program proceeds to step S28 without feeding a line. If no red or blue print data for the same line are found at step S28, the carriage 3 just returns to the initial position at the extreme lefthand end of the platen roller 1 at step S29. If there are red or blue print data, the carriage 3 is returned to the print start position for the backward movement at steps S30 and S31. Then the thermal head 8 is pressed upon the platen roller 1 at step S32 and the carriage 3 is moved backward to print the data while taking up the red or blue ink film in the film cassette 10 at step S33. When step S34 finds completion of one line of printing, the thermal head 8 is released from the pressure contact at step S35 and the carriage 3 is returned to the lefthand end of platen roller 1. If step S36 indicates the need to print a next line, a line feed is effected at step S37 and the above sequence is repeated. If there is no next line to be printed, that is the printing operation is completed, the carriage 3 is returned to the initial, extreme lefthand position at step S38 to end the control operation.

While in the operation illustrated in FIG. 11 the black ink film is used during the forward movement of the carriage 3 and the red or blue ink film is used during the backward movement thereof, it is possible to use the red or blue ink film during the forward movement of the carriage 3 and to use the black ink film during the backward movement. The black ink film may of course be replaced by an ink film of another color.

Furthermore, the ink film in one cassette may include an alternation of yellow and cyan and the ink film in the other cassette an alternation of magenta and black. This will enable printing in three or more colors by using these colors individually or in superposition.

Figure 12:
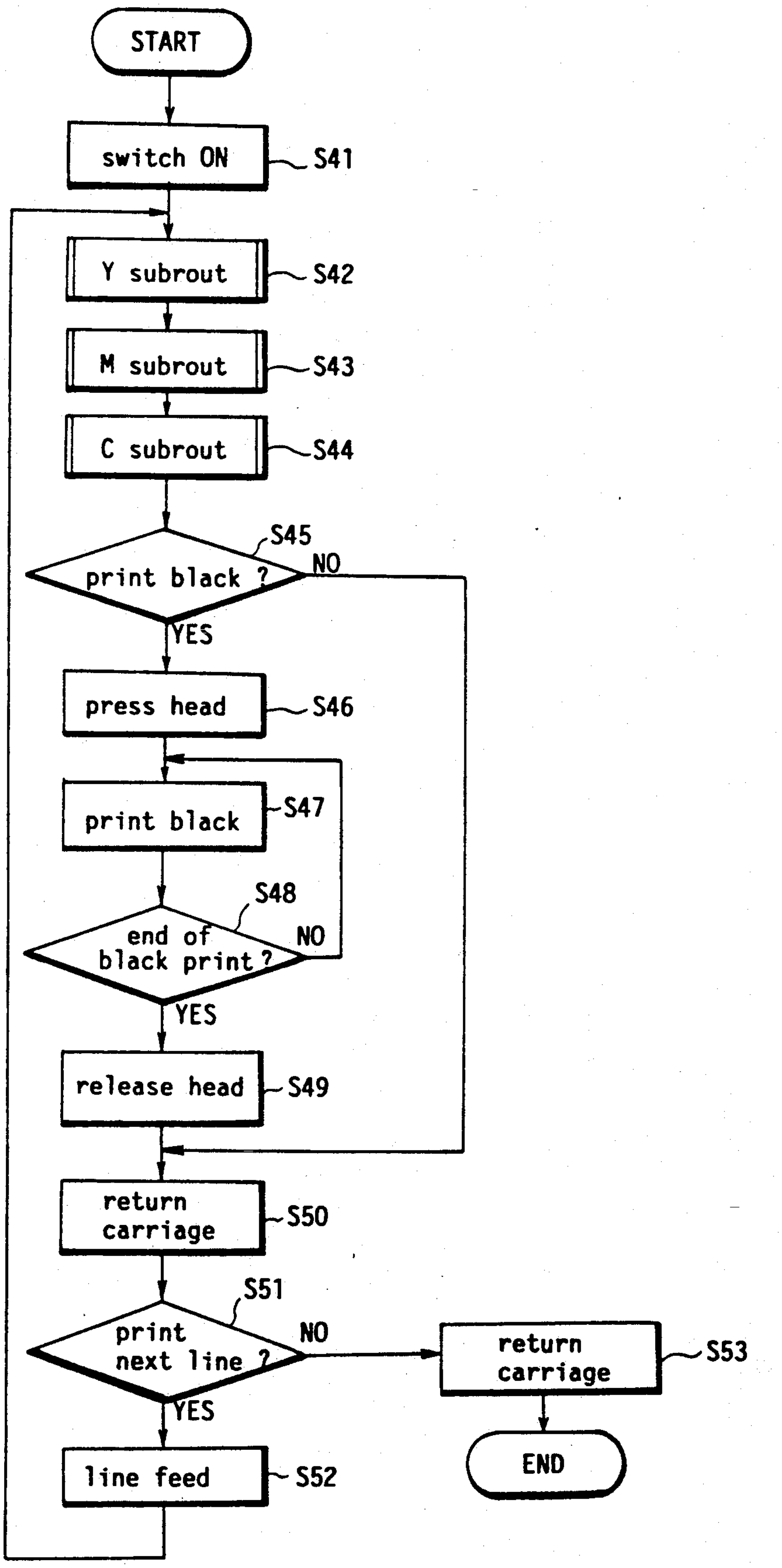
FIG. 12 is a flowchart illustrating a multicolor printing operation of the printer.
Figure 14:
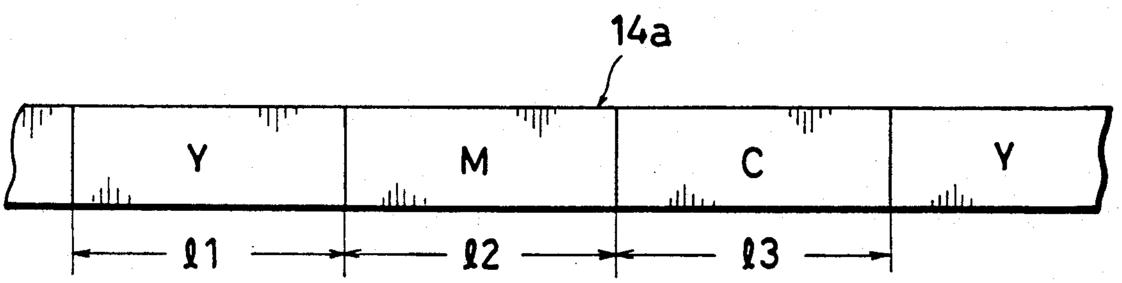
FIG. 14 is an explanatory view of a color ink film.

FIG. 12 is a flowchart illustrating an operation of the control system where an ink film having a plurality of colors is used for printing with the forward movement of the carriage 3, and a black ink film is used for printing with the backward movement of the carriage 3. As shown in FIG. 14, the color ink film 14a includes sections of three colors, yellow Y, magenta M and cyan C, arranged alternately and in repeated series longitudinally of the ink film.

When the print switch is turned on with the carriage 3 at the lefthand end of the platen roller 1 at step S41, the program moves to step S42 for yellow printing, step S43 for magenta printing, and then step S44 for cyan printing.

Figure 13:
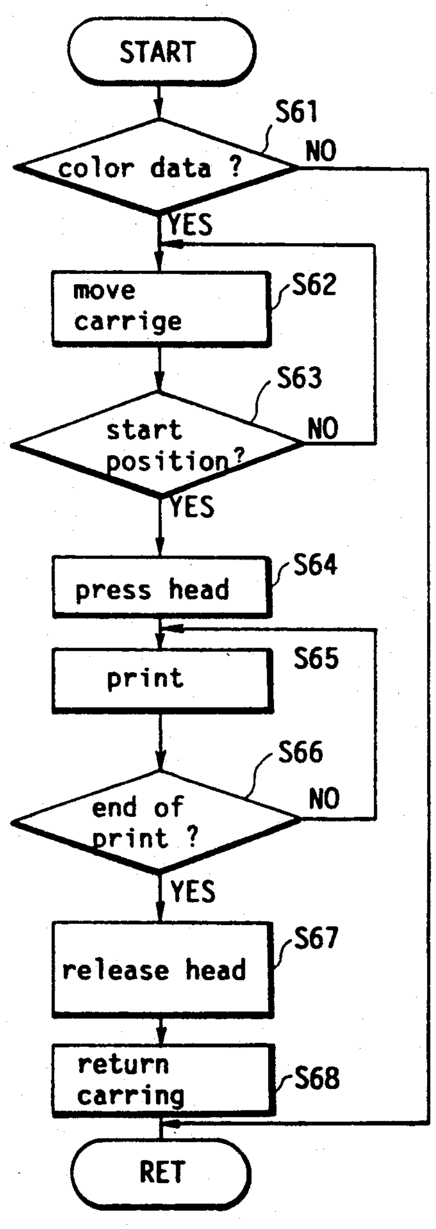
FIG. 13 is a flowchart illustrating details of a subroutine in the flowchart of FIG. 12.

Each of these subroutines at steps S43, S44 and S45 is executed in accordance with the flowchart of FIG. 13. In the subroutine for yellow printing, for example, step S61 checks whether or not yellow print data for one line are input to the head control circuit, etc. If they are, the carriage 3 is moved to the print start position at steps S62 and S63. Then the thermal head 7 is pressed upon the platen roller 1 at step S64, and printing is effected at step S65 while pressing the yellow sections of the color ink film in the cassette 9 upon the recording paper and taking up this ink film. When the printing for one line is completed at step S66, the thermal head 7 is released from the pressure contact at step S67. The film takeup is stopped simultaneously and the carriage 3 is returned to the position at the lefthand end at step S68. Thereafter, the magenta printing subroutine at step S43 and the cyan printing subroutine at step S44 are executed likewise, to complete printing in the color graphic mode.

It will be noted that the subroutine for cyan printing does not necessitate step S68 in FIG. 13. Upon release of the thermal head from the pressure tact, the carriage 3 is moved to the righthand end as shown in FIG. 3.

If step S45 finds the input of black printing data after completion of the color graphic mode printing, the carriage is moved backward and the thermal head 8 is pressed upon the platen roller 1 at step S46. Then printing is carried out while taking up the black ink film at step S47. When printing for one line is completed at step S48, the thermal head 8 is released from the pressure contact at step S49 and the carriage is returned to the original position at step S50. If at this time step S51 finds the input of printing data for a next line, a line feed is effected at step S52 to repeat the above printing operation. In the absence of further printing data, the printing operation is terminated.

Although in the operation illustrated in FIG. 12, printing is carried out in the color graphic mode during the forward movement of the carriage and in the black text mode during the backward movement thereof, it is of course possible to print in the black text mode during the forward movement and in the color graphic mode during the backward movement.

Figure 15:
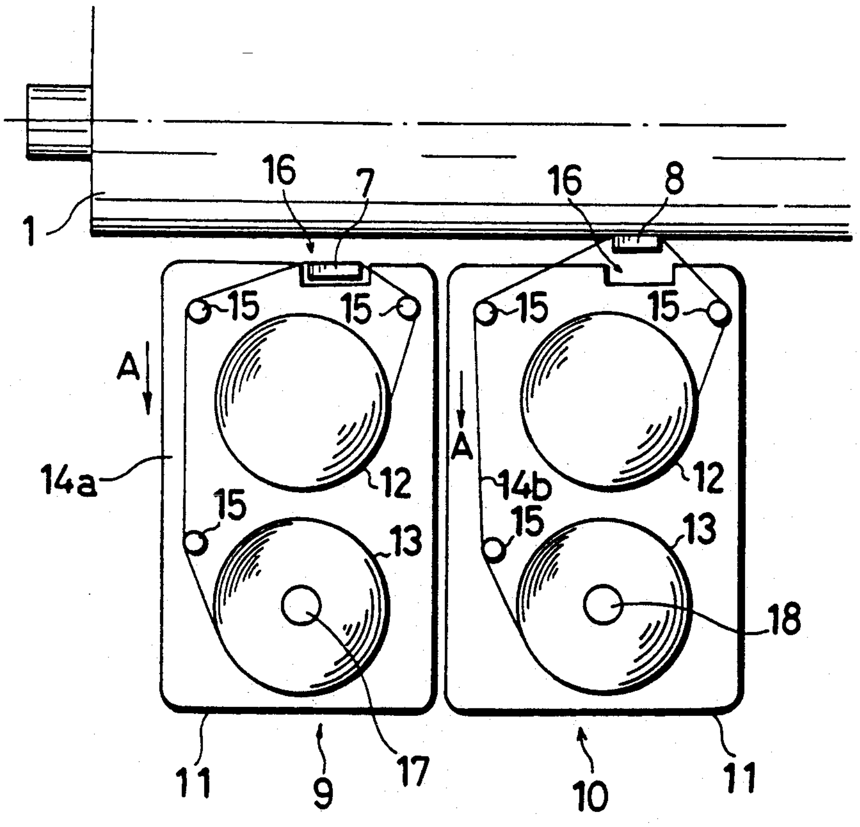
FIG. 15 is a plan view of a further example of the ink film cassette arrangement on the carriage.
Figure 16:
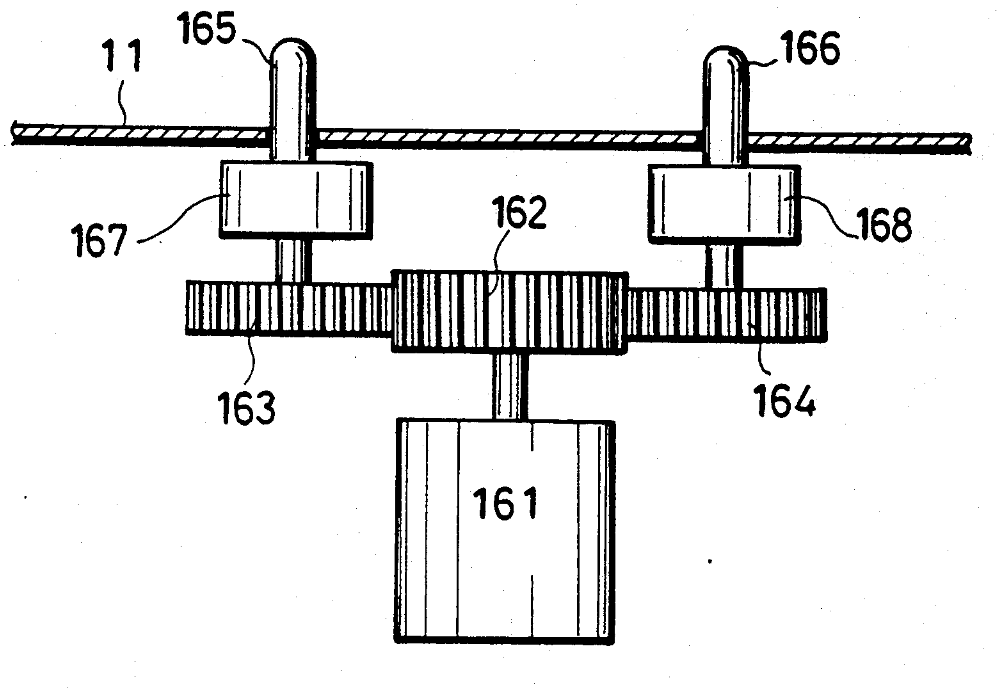
FIG. 16 is a side view of a further example of the ink film drive mechanism.

FIG. 15 shows the two cassettes 9 and 10 mounted on the carriage 3 with the ink films taken up in the same direction A. Since the printing operation is carried out while pressing one of the ink films upon recording paper on the platen roller, the film takeup direction must be the direction opposite to that of carriage movement. Therefore, where the ink films in the two cassettes are taken up in the same direction as in FIG. 15, the printing operation by the two thermal heads is carried out while the carriage moves in one direction. Thus the ink film takeup is also effected during the carriage movement in one direction (which is the forward movement in this embodiment). An ink film drive mechanism applicable to this mode is illustrated in FIG. 16. As seen, the drive mechanism includes a motor 161, a drive gear 162 fixed on a shaft of the motor 161, driven gears 163 and 164 meshed with the drive gear 162, drive shafts 165 and 166 connected to the film takeup reel and film supply reel, and clutches 167 and 168 interposed between the driven gears 163, 164 and the drive shafts 165, 166, respectively. The clutches 167 and 168 comprise known electromagnetic clutches, for example, which are controllable by an unillustrated control circuit to selectively connect the two drive shafts 165 and 166 to the driven gears 163 and 164.

Figure 17:
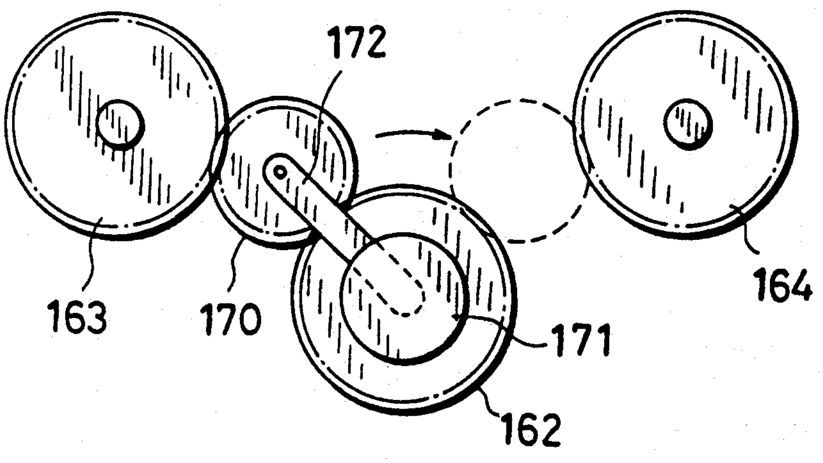
FIG. 17 is a plan view of the ink film drive mechanism of FIG. 16.

FIG. 17 shows another example of film drive mechanism applicable to the cassette arrangment shown in FIG. 15. This drive mechanism includes a drive gear 162, driven gears 163 and 164 spaced from the drive gear 162, and an intermediate gear 170 meshed with the drive gear 162. The intermediate gear 170 is movable by a rotary solenoid 171 while remaining in mesh with the drive gear 162, to selectively mesh with the driven gear 163 and 164. In this example, the drive shafts 165 and 166 are directly connected to the driven gears 163 and 164. Number 172 in FIG. 17 indicates pivoting arms of the rotary solenoid 171.

Although not shown, the ink film drive mechanism may have the drive shafts 165 and 166 connected to two separate motors and selectively driven by operating the motors individually.

The two cassettes 9 and 10 used in the embodiment of FIG. 15 may both contain black ink films. Alternatively, one of the cassettes may contain a black ink film with the other containing a unicolor ink film such as a red or blue ink film or a plural color ink film as shown in FIG. 14. The printing operation with these ink film cassettes is carried out only when the carriage moves forward, and in one color with one forward movement. Where one of the cassettes contains a black ink film and the other contains a plural color ink film, for example, the printing operation may be carried out in accordance with the flowchart shown in FIGS. 12 and 13. However, this printing operation requires step S68 of returning the carriage in the subroutine for cyan printing, which step is hereinbefore described in connection with FIGS. 12 and 13 as unnecessary. If there are black printing data after the cyan printing subroutine is completed and the carriage is returned, the carriage is again moved forward to carry out a black printing operation. If there are printing data for a next line after all the colors are printed, a line feed is effected and a similar process is repeated (steps S45–S52).

Figure 18:
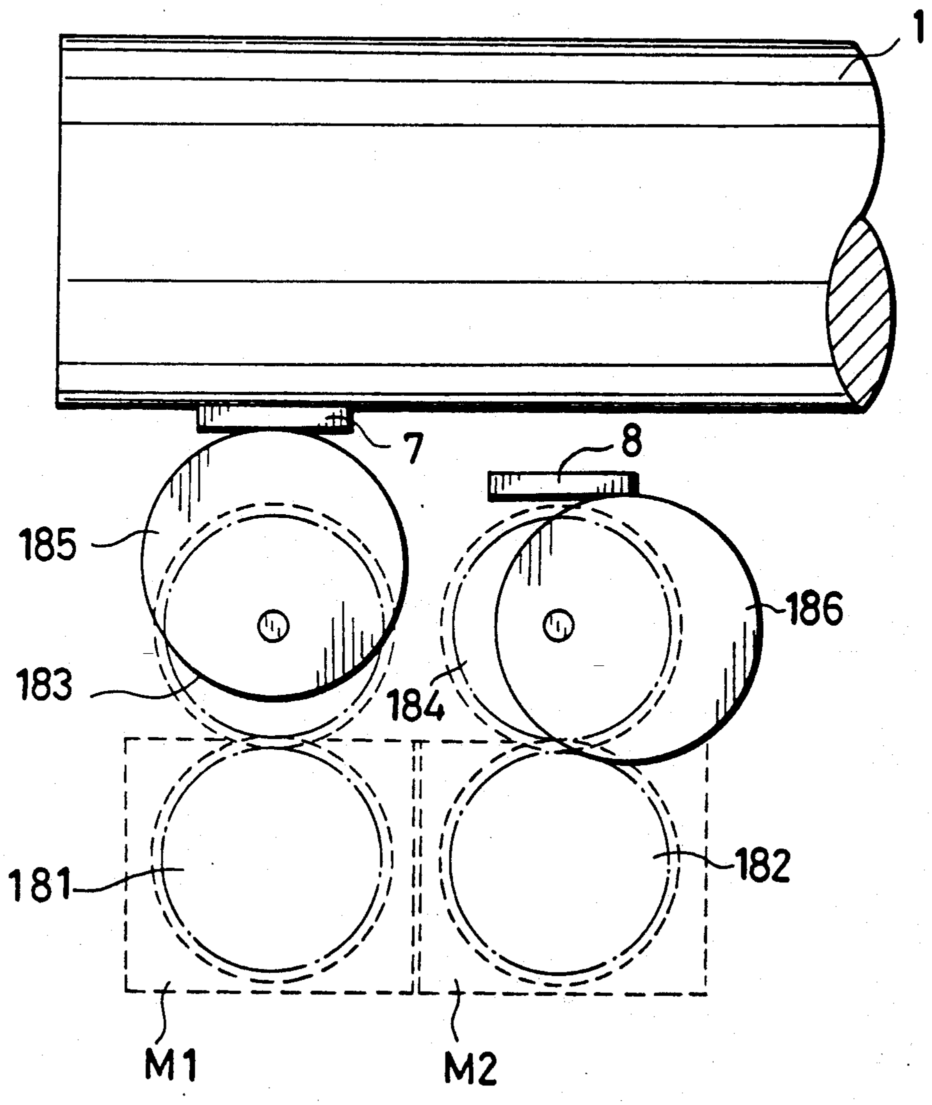
FIG. 18 is a schematic plan view of a further example of head projecting mechanism.

In the foregoing embodiments the head projecting mechanism acts to selectively press the two thermal heads upon the platen roller. The invention, however, also includes within its scope a head projecting mechanism for pressing the two thermal heads independently of each other, as shown in FIG. 18. This mechanism includes motors M1 and M2, main gears 181 and 182 attached to output shafts of these motors, driven gears 183 and 184 meshed with the main gears 181 and 182, and eccentric cams 185 and 186 attached to shafts of the driven gears 183 and 184, respectively. Each eccentric cam 185 or 186 is rotatable by the motor M1 or M2 independently of the other cam. The motors M1 and M2 are controllable by an unillustrated drive circuit. Where, as here, the two thermal heads 7 and 8 are driven into pressure contact separately and independently, it is necessary to take up the ink films in synchronism therewith. For this purpose, the drive mechanism as shown in FIG. 16 may be utilized by independently operating the clutches 167 and 168. Although not shown, the ink film takeup reels may be connected to the shafts of separate motors controllable independently of each other.

Figure 19:
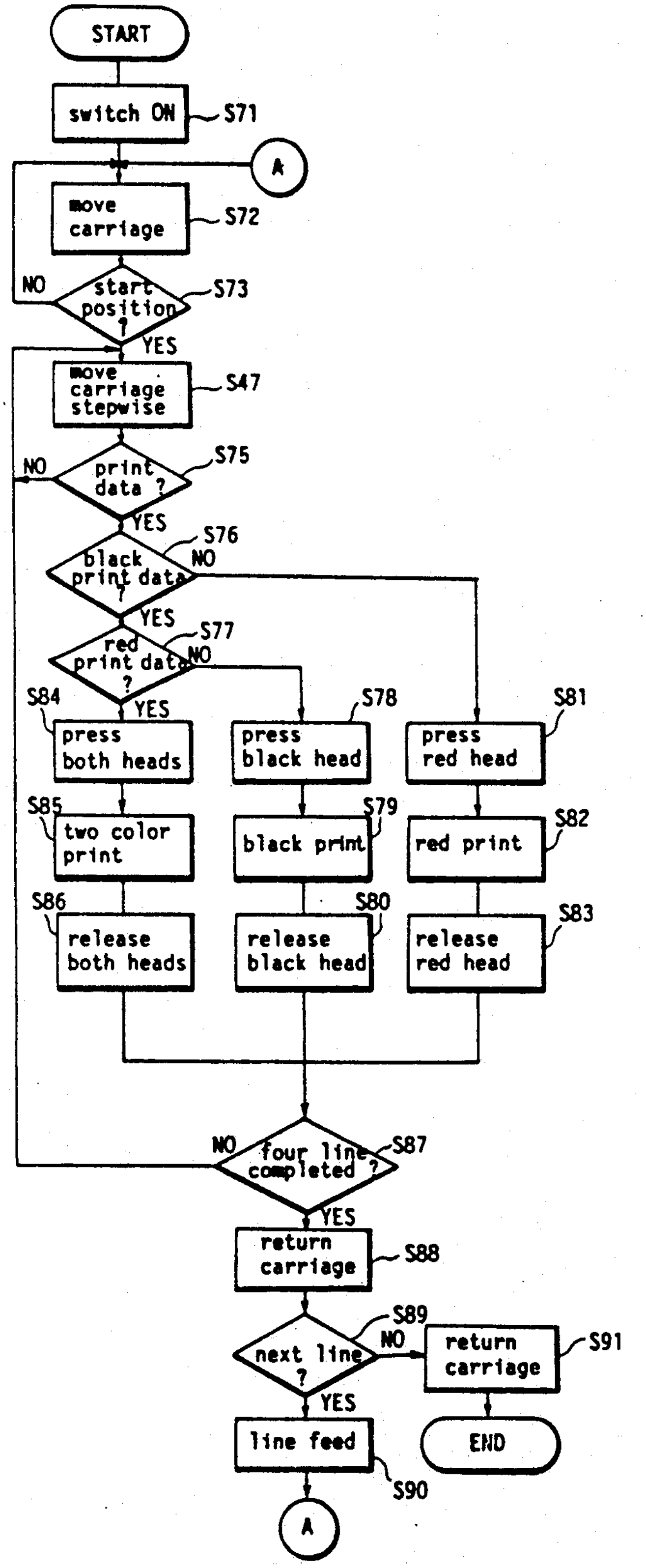
FIG. 19 is a flowchart of a further example of a printing operation of the printer according to the present invention.

FIG. 19 shows a flowchart illustrating an operation of the control circuit for actuating the head projecting mechanism of FIG. 18 to project the two heads seperately and independently during the forward movement of the carriage. In this example, one of the ink film cassettes contains a black ink film and the other a red ink film.

First, the print switch is turned on at step S71 and, after the carriage moves to the start position at steps S72 and S73, judgment is made whether print data are stored in the thermal head drive circuit, not shown, while moving the carriage stepwise at steps S74 and S75. If there are print data stored, judgment is made at steps S76 and S77 whether these data are for black printing, for red printing or for both. If the data are for black printing, the thermal head 7 is pressed upon the platen roller at step S78 and black printing is carried out at step S79. In the case of red printing data, the other thermal head 8 is pressed upon the platen roller at step S81 and red printing is carried out at step S82. If the data are for black and red printing, both thermal heads 7 and 8 are pressed upon the platen roller at step S84 and two-color printing is carried out at step S85. After the printing, the thermal heads 7 and/or 8 are released from the pressure contact with the platen roller at steps S80, S83 and S86.

The above operation is carried out until one line is printed. After completion of the line at step S87, the carriage is returned to the lefthand end at step S88. If there are data for printing a next line at step S89, a line feed is effected at step S90 and the above operation is repeated. If there is no further printing data, the carriage is returned to the initial position at step S91 to terminate the printing operation.

Although printing is effected during the forward movement of the carriage in the above embodiment, it is in order if printing is effected during the backward movement of the carriage.

The ink film colors are not limited to black and red, but may be any desired combination of two colors such as black and blue or red and blue.

In all of the foregoing embodiments, one or both of the thermal heads are pressed upon the platen roller for each printing cycle. Alternatively, the thermal heads may constantly be pressed upon the platen roller to effect the printing in response to pulse signals applied thereto.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A carriage shift type thermal printer, comprising:

a rotatable platen roller for guiding recording paper;

a carriage opposed to and reciprocable axially of said platen roller, said carriage including two ink films and ink film cassettes arranged axially of said platen roller, each of the cassettes being provided with a film supply reel and a film takeup reel arranged on a same plane in a direction perpendicular to the direction of carriage movement, head projecting means for pressing upon said platen roller two thermal heads associated with said cassettes, and ink film drive means for transporting the ink films in a direction parallel to the direction of carriage movement at a position opposed to said platen roller and for taking up ink films; and control means for controlling said head projecting means and said film drive means;

wherein said two ink film cassettes are arranged on said carriage with respective ink film takeup directions opposite to each other.

2. A carriage sift type the thermal printer, comprising:

a rotatable platen roller for guiding recording paper;

a carriage opposed to and reciprocable axially of said platen roller, said carriage including two ink films and ink film cassettes arranged axially of said platen roller, each of the cassettes being provided with a film supply reel and a film takeup reel arranged on a same plane in a direction perpendicular to the direction of carriage movement, head projecting means for pressing upon said platen roller two thermal heads associated with said cassettes, and ink film drive means for transporting the ink films in a direction parallel to the direction of carriage movement at a position opposed to said platen roller and for taking up ink films; and control means for controlling said head projecting means and said film drive means;

wherein one of said two ink film cassettes mounted on said carriage contains a black ink film and the other contains a color ink film including a single color.

3. A carriage shift type thermal printer, comprising:

a rotatable platen roller for guiding recording paper;

a carriage opposed to and reciprocable axially of said platen roller, said carriage including two ink films and ink film cassettes arranged axially of said platen roller, each of the cassettes being provided with a film supply reel and a film takeup reel arranged on a same plane in a direction perpendicular to the direction of carriage movement, head projecting means for pressing upon said platen roller two thermal heads associated with said cassettes, and ink film drive means for transporting the ink films in a direction parallel to the direction of carriage movement at a position opposed to said platen roller and for taking up ink films; and control means for controlling said head projecting means and said film drive means;

wherein one of said two ink film cassettes mounted on said carriage contains a black ink film and the other contains a color ink film including yellow, magenta and cyan arranged in a selected alternating order.

4. A carriage shift type thermal printer, comprising:

a rotatable platen roller for guiding recording paper;

a carriage opposed to and reciprocable axially of said platen roller, said carriage including two ink films and ink film cassettes arranged axially of said platen roller, each of the cassettes being provided with a film supply reel and a film takeup reel arranged on a same plane in a direction perpendicular to the direction of carriage movement, head projecting means for pressing upon said platen roller two thermal heads associated with said cassettes, and ink film drive means for transporting the ink films in a direction parallel to the direction of carriage movement at a position opposed to said platen roller and for taking up ink films; and control means for controlling said head projecting means and said film drive means;

wherein said head projecting means in said carriage includes a mechanism for alternately pressing and releasing said two thermal heads, and single drive source for actuating said mechanism.

5. A carriage shift type thermal printer, comprising:

a rotatable platen roller for guiding recording paper;

a carriage opposed to and reciprocable axially of said platen roller, said carriage including two ink films and ink film cassettes arranged axially of said platen roller, each of the cassettes being provided with a film supply reel and a film takeup reel arranged on a same plane in a direction perpendicular to the direction of carriage movement, head projecting means for pressing upon said platen roller two thermal heads associated with said cassettes, and ink film drive means operatively connected to said two ink film cassettes for transporting the ink films in a direction parallel to the direction of carriage movement at a position opposed to said platen roller and for taking up ink films; and control means for controlling said head projecting means and said film drive means;

wherein said ink film drive mans is operable to take up only the ink film in one of said ink film cassettes during a forward movement of said carriage and to take up only the ink film in the other ink film cassette during a backward movement of said carriage.

6. A thermal printer as claimed in claim 5, wherein said ink film drive means includes a single reversible rotary drive source, a first one-way clutch operable with a forward rotation of said rotary drive source, a second one-way clutch operable with a reverse rotation of said rotary drive source, a first transmission shaft for connecting said first one-way clutch to a takeup reel in one of said ink film cassettes, and a second transmission shaft for connecting said second one-way clutch to a takeup reel in the other ink film cassette.

7. A carriage shift type thermal printer, comprising:

a rotatable platen roller for guiding recording paper;

a carriage opposed to and reciprocable axially of said platen roller, said carriage including two ink films and ink film cassettes arranged axially of said platen roller, each of the cassettes being provided with a film supply reel and a film takeup reel arranged on a same plane in a direction perpendicular to the direction of carriage movement, head projecting means for pressing upon said platen roller two thermal heads associated with said cassettes, and ink film drive means operatively connected to said two ink film cassettes for transporting the ink films in a direction parallel to the direction of carriage movement at a position opposed to said platen roller and for taking up ink films; and control means for controlling said head projecting means and said film drive means;

wherein said ink film drive means is operable to take up the ink films in said two ink film cassettes during one of a forward movement and a backward movement of said carriage, and includes a single rotary drive source rotatable in one direction, a drive gear fixed on an output shaft of said drive source, a first driven gear fixed on a driven shaft connected to a takeup reel in one of said ink film cassettes , a second driven gear fixed on a driven shaft connected to a takeup reel in the other ink film cassette, a transmission gear interposable selectively between said drive gear and said first driven gear and between said drive gear and said second driven gear to transmit torque of said rotary drive source to one of said takeup reels in said ink film cassettes, and switching means for interposing said transmission gear selectively between said drive gear and said first driven gear and between said drive gear and said second driven gear.

8. A carriage shift type thermal printer comprising:

a rotatable platen roller for guiding recording paper;

a carriage opposed to and reciprocable axially of said platen roller, said carriage being adapted to carry two ink film cassettes arranged axially of said platen roller, and including head projecting means for pressing upon said platen roller two thermal heads associated with said ink film cassettes, and film drive means for taking up ink films; and control means for controlling said head projecting means and said ink film drive means to print by using one of said thermal heads and an ink film corresponding to said one of said thermal heads during a forward movement of said carriage and to print by using the other thermal head and an ink film corresponding to said other thermal head during a backward movement of said carriage.

9. A thermal printer as claimed in claim 8, wherein said two ink film cassettes are arranged on said carriage axially of said platen roller with respective ink takeup directions opposite to each other.

10. A thermal printer as claimed in claim 9, wherein each of said two ink film cassettes is mounted on said carriage with a film takeup reel and a film supply reel arranged in a direction perpendicular to a direction of carriage movement.

11. A thermal printer as claimed in claim 9, wherein said two ink film cassettes mounted on said carriage contain ink films of the same color.

12. A thermal printer as claimed in claim 9, wherein one of said two ink film cassettes mounted on said carriage contains a black ink film and the other contains a color ink film including a single color.

13. A thermal printer as claimed in claim 9, wherein one of said two ink film cassettes mounted on said carriage contains a black ink film and the other contains a color ink film including yellow, magenta and cyan arranged in a selected alternating order.

14. A thermal printer as claimed in claim 9, wherein said head projecting means in said carriage includes a mechanism for alternately pressing and releasing said two thermal heads, and a single drive source for actuating said mechanism.

15. A thermal printer as claimed in claim 9, wherein said ink film drive means in said carriage is operatively connected to said two ink film cassettes mounted on said carriage.

16. A thermal printer as claimed in claim 15, wherein said ink film drive means is operable to take up only the ink film in one of said ink film cassettes during a forward movement of said carriage and to take up only the ink film in the other ink film cassette during a backward movement of said carriage.

17. A thermal printer as claimed in claim 16, wherein said ink film drive means includes a single reversible rotary drive source, a first one-way clutch operable with a forward rotation of said rotary drive source, a second one-way clutch operable with a reverse rotation of said rotary drive source, a first transmission shaft for connecting said first one-way clutch to a takeup reel in one of said ink film cassettes, and a second transmission shaft for connecting said second one-way clutch to a takeup reel in the other ink film cassette.

18. A carriage shift type thermal printer, comprising:

a rotatable platen roller for guiding recording paper;

a carriage opposed to and reciprocable axially of said platen roller, said carriage being adapted to carry two ink film cassettes arranged axially of said platen roller, and including head projecting means for pressing upon said platen roller two thermal heads associated with said ink film cassettes, and ink film drive means for taking up ink films; and control means for controlling said two thermal heads independently of each other to press the thermal heads upon the platen roller so that each of the thermal heads is pressed against the platen roller during only one of a forward movement and a backward movement of said carriage, wherein one of said two ink film cassettes mounted on said carriage contains a black ink film and the other contains a color ink film including a single color.

* * * * *